United States Patent

Robinson

[19]

[11] Patent Number: 5,845,284
[45] Date of Patent: Dec. 1, 1998

[54] METHOD AND COMPUTER PROGRAM PRODUCT FOR CREATING A PLURALITY OF MIXED PSEUDO-RECORDS COMPOSED OF WEIGHTED MIXTURES OF EXISTING RECORDS IN A DATABASE

[75] Inventor: Marke James Robinson, Belmont, Mass.

[73] Assignee: Media Plan, Inc., Sandy, Utah

[21] Appl. No.: 760,909

[22] Filed: Dec. 6, 1996

[51] Int. Cl.$^6$ .................................................. G06F 17/30
[52] U.S. Cl. ......................................................... 707/101
[58] Field of Search ............................................ 707/101

[56] References Cited

U.S. PATENT DOCUMENTS

| | | | |
|---|---|---|---|
| 5,319,779 | 6/1994 | Chang et al. | 707/3 |
| 5,537,586 | 7/1996 | Amram et al. | 707/3 |
| 5,734,890 | 3/1998 | Case et al. | 707/5 |
| 5,740,425 | 4/1998 | Povilus | 707/100 |

*Primary Examiner*—Wayne Amsbury
*Attorney, Agent, or Firm*—Workman, Nydegger & Seeley

[57] ABSTRACT

A method and computer program product for creating plurality of pseudo-records based on existing records is provided. Database records having N key fields and one or more data fields that exist in a database. A user will select from a graphical user interface one of the N key fields as a mix category. From the mix category, values and weightings for those values will be chosen in order to create a mix of records having those values. Also, values from each of the remaining N-1 key fields are chosen so that records may be found to serve as a basis for the new pseudo-records. Each pseudo-record is formed by storing the formulaic composition of a hybrid value in the key field representing the mix category, assigning each of the N-1 remaining key fields a value from the corresponding key fields in the group of data records making up the basis for the pseudo-record, and assigning each of the data record fields a mixed value composed of applying the hybrid value weightings to each of the respective values in the corresponding base data records to create the mixed value.

12 Claims, 12 Drawing Sheets

| MEDIUM | MARKET | UNIT SIZE | DEMOGRAPHICS | COST | | RATING POINT INFORMATION | | |
|---|---|---|---|---|---|---|---|---|
| Day TV | New York | 30 Seconds | Women 25-54 | CPP | 1/1/97,1000 | | | 4/1/97,1200 |
| Prime TV | New York | 30 Seconds | Women 25-54 | CPP | 1/1/97,2000 | 2/1/97,2400 | 3/1/97,2500 | 4/1/97,2600 |
| News TV | New York | 30 Seconds | Women 25-54 | CPP | 1/1/97,1500 | | | 4/1/97,1800 |
| Late Night TV | New York | 30 Seconds | Women 25-54 | CPP | 1/1/97,1400 | | | 4/1/97,1600 |
| Day TV | Chicago | 30 Seconds | Women 25-54 | CPP | 1/1/97,800 | | | 4/1/97,1000 |
| Prime TV | Chicago | 30 Seconds | Women 25-54 | CPP | 1/1/97,1700 | 2/1/97,1900 | 3/1/97,2000 | 4/1/97,2100 |
| News TV | Chicago | 30 Seconds | Women 25-54 | CPP | 1/1/97,1200 | | | 4/1/97,1500 |
| Late Night TV | Chicago | 30 Seconds | Women 25-54 | CPP | 1/1/97,1000 | | | 4/1/97,1200 |
| Day TV | Los Angeles | 30 Seconds | Women 25-54 | CPP | 1/1/97,900 | | | 4/1/97,1100 |
| Prime TV | Los Angeles | 30 Seconds | Women 25-54 | CPP | 1/1/97,1800 | 2/1/97,2100 | 3/1/97,2200 | 4/1/97,2300 |
| News TV | Los Angeles | 30 Seconds | Women 25-54 | CPP | 1/1/97,1500 | | | 4/1/97,1750 |
| Late Night TV | Los Angeles | 30 Seconds | Women 25-54 | CPP | 1/1/97,1250 | | | 4/1/97,1450 |

FIG. 1A

| MEDIUM | MARKET | UNIT SIZE | DEMOGRAPHICS | COST | 1/1/97 | 2/1/97 | 3/1/97 | 4/1/97 |
|---|---|---|---|---|---|---|---|---|
| Day TV | New York | 30 Seconds | Women 25-54 | CPP | 1000 | 1000 | 1000 | 1200 |
| Prime TV | New York | 30 Seconds | Women 25-54 | CPP | 2000 | 2400 | 2500 | 2600 |
| News TV | New York | 30 Seconds | Women 25-54 | CPP | 1500 | 1500 | 1500 | 1800 |
| Late Night TV | New York | 30 Seconds | Women 25-54 | CPP | 1400 | 1400 | 1400 | 1600 |
| Day TV | Chicago | 30 Seconds | Women 25-54 | CPP | 800 | 800 | 800 | 1000 |
| Prime TV | Chicago | 30 Seconds | Women 25-54 | CPP | 1700 | 1900 | 2000 | 2100 |
| News TV | Chicago | 30 Seconds | Women 25-54 | CPP | 1200 | 1200 | 1200 | 1500 |
| Late Night TV | Chicago | 30 Seconds | Women 25-54 | CPP | 1000 | 1000 | 1000 | 1200 |
| Day TV | Los Angeles | 30 Seconds | Women 25-54 | CPP | 900 | 900 | 900 | 1100 |
| Prime TV | Los Angeles | 30 Seconds | Women 25-54 | CPP | 1800 | 2100 | 2200 | 2300 |
| News TV | Los Angeles | 30 Seconds | Women 25-54 | CPP | 1500 | 1500 | 1500 | 1750 |
| Late Night TV | Los Angeles | 30 Seconds | Women 25-54 | CPP | 1250 | 1250 | 1250 | 1450 |

FIG. 1B

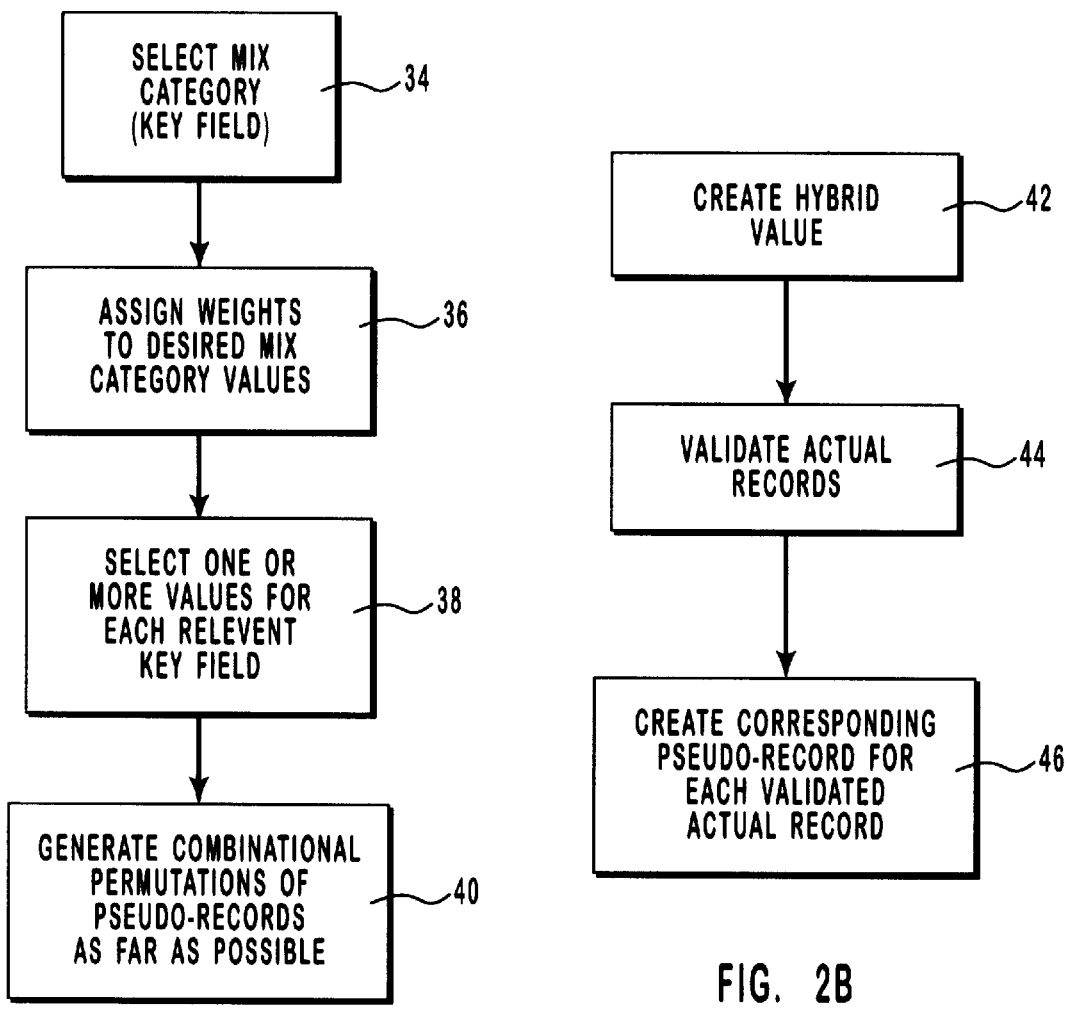

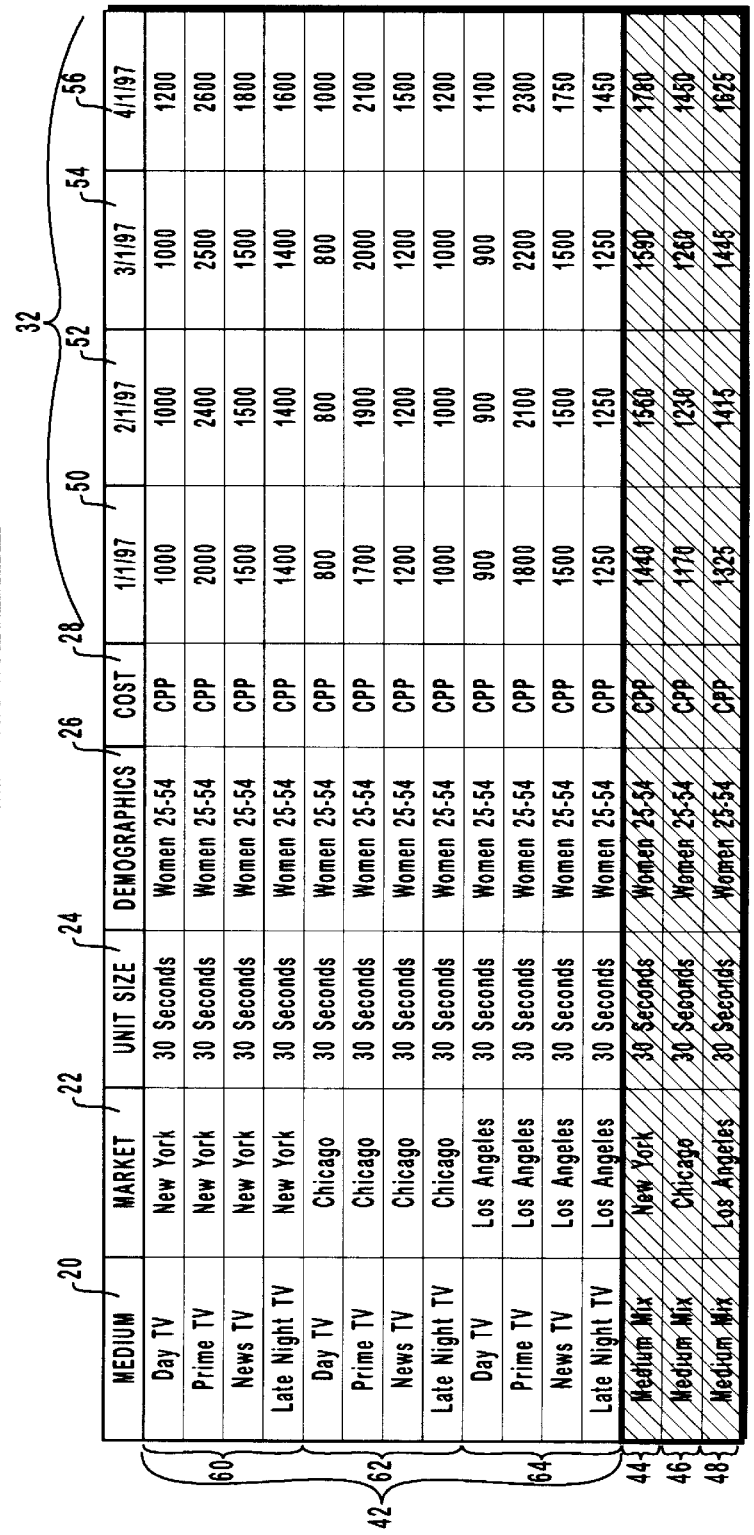

| MEDIUM | PERCENT |
|---|---|
| Day TV | 40 |
| Prime TV | 30 |
| News TV | 20 |
| Late Night TV | 10 |

| MEDIUM | MARKET | UNIT SIZE | DEMOGRAPHICS | COST | 1/1/97 | 2/1/97 | 3/1/97 | 4/1/97 |
|---|---|---|---|---|---|---|---|---|
| Day TV | New York | 30 Seconds | Women 25-54 | CPP | 1000 | 1000 | 1000 | 1200 |
| Prime TV | New York | 30 Seconds | Women 25-54 | CPP | 2000 | 2400 | 2500 | 2600 |
| News TV | New York | 30 Seconds | Women 25-54 | CPP | 1500 | 1500 | 1500 | 1800 |
| Late Night TV | New York | 30 Seconds | Women 25-54 | CPP | 1400 | 1400 | 1400 | 1600 |
| Day TV | Chicago | 30 Seconds | Women 25-54 | CPP | 800 | 800 | 800 | 1000 |
| Prime TV | Chicago | 30 Seconds | Women 25-54 | CPP | 1700 | 1900 | 2000 | 2100 |
| News TV | Chicago | 30 Seconds | Women 25-54 | CPP | 1200 | 1200 | 1200 | 1500 |
| Late Night TV | Chicago | 30 Seconds | Women 25-54 | CPP | 1000 | 1000 | 1000 | 1200 |
| Day TV | Los Angeles | 30 Seconds | Women 25-54 | CPP | 900 | 900 | 900 | 1100 |
| Prime TV | Los Angeles | 30 Seconds | Women 25-54 | CPP | 1800 | 2100 | 2200 | 2300 |
| News TV | Los Angeles | 30 Seconds | Women 25-54 | CPP | 1500 | 1500 | 1500 | 1750 |
| Late Night TV | Los Angeles | 30 Seconds | Women 25-54 | CPP | 1250 | 1250 | 1250 | 1450 |
| Medium Mix | New York | 30 Seconds | Women 25-54 | CPP | 1440 | 1560 | 1590 | 1780 |
| Medium Mix | Chicago | 30 Seconds | Women 25-54 | CPP | 1170 | 1230 | 1260 | 1450 |
| Medium Mix | Los Angeles | 30 Seconds | Women 25-54 | CPP | 1325 | 1415 | 1445 | 1625 |

| MARKET | WEIGHTING |
|---|---|
| New York | 1.0 |
| Chicago | 1.0 |
| Los Angeles | 1.0 |

FIG. 4A

| MEDIUM | MARKET | WEIGHTING |
|---|---|---|
| Medium Mix | New York | 1.0 |
| Medium Mix | Chicago | 1.0 |
| Medium Mix | Los Angeles | 1.0 |

FIG. 5A

| MEDIUM | MARKET | UNIT SIZE | DEMOGRAPHICS | COST | 1/1/97 | 2/1/97 | 3/1/97 | 4/1/97 |
|---|---|---|---|---|---|---|---|---|
| Day TV | New York | 30 Seconds | Women 25-54 | CPP | 1000 | 1000 | 1000 | 1200 |
| Prime TV | New York | 30 Seconds | Women 25-54 | CPP | 2000 | 2400 | 2500 | 2600 |
| News TV | New York | 30 Seconds | Women 25-54 | CPP | 1500 | 1500 | 1500 | 1800 |
| Late Night TV | New York | 30 Seconds | Women 25-54 | CPP | 1400 | 1400 | 1400 | 1600 |
| Day TV | Chicago | 30 Seconds | Women 25-54 | CPP | 800 | 800 | 800 | 1000 |
| Prime TV | Chicago | 30 Seconds | Women 25-54 | CPP | 1700 | 1900 | 2000 | 2100 |
| News TV | Chicago | 30 Seconds | Women 25-54 | CPP | 1200 | 1200 | 1200 | 1500 |
| Late Night TV | Chicago | 30 Seconds | Women 25-54 | CPP | 1000 | 1000 | 1000 | 1200 |
| Day TV | Los Angeles | 30 Seconds | Women 25-54 | CPP | 900 | 900 | 900 | 1100 |
| Prime TV | Los Angeles | 30 Seconds | Women 25-54 | CPP | 1800 | 2100 | 2200 | 2300 |
| News TV | Los Angeles | 30 Seconds | Women 25-54 | CPP | 1500 | 1500 | 1500 | 1750 |
| Late Night TV | Los Angeles | 30 Seconds | Women 25-54 | CPP | 1250 | 1250 | 1250 | 1450 |
| Medium Mix | New York | 30 Seconds | Women 25-54 | CPP | 1440 | 1560 | 1590 | 1780 |
| Medium Mix | Chicago | 30 Seconds | Women 25-54 | CPP | 1170 | 1230 | 1260 | 1450 |
| Medium Mix | Los Angeles | 30 Seconds | Women 25-54 | CPP | 1325 | 1415 | 1445 | 1625 |
| Day TV | Market Mix | 30 Seconds | Women 25-54 | CPP | 2700 | 2780 | 2700 | 3300 |
| Prime TV | Market Mix | 30 Seconds | Women 25-54 | CPP | 5500 | 6400 | 6700 | 7000 |
| News TV | Market Mix | 30 Seconds | Women 25-54 | CPP | 4200 | 4200 | 4200 | 5050 |
| Late Night TV | Market Mix | 30 Seconds | Women 25-54 | CPP | 3650 | 3650 | 3650 | 4250 |
| Medium Mix | Market Mix | 30 Seconds | Women 25-54 | CPP | 3935 | 4205 | 4295 | 4855 |

FIG. 5B 5,845,284

METHOD AND COMPUTER PROGRAM PRODUCT FOR CREATING A PLURALITY OF MIXED PSEUDO-RECORDS COMPOSED OF WEIGHTED MIXTURES OF EXISTING RECORDS IN A DATABASE

BACKGROUND OF THE INVENTION

1. The Field of the Invention

The present invention relates to pseudo-records such as spreadsheet formula cells and ways of creating the same. More specifically, the present invention relates to the automatic creation of a plurality of pseudo-records based on selected user input.

2. Present State of the Art

A data record may conveniently be broken up into data fields of two basic types depending on how the fields are used. The first type are categorical fields or key fields used in searching for the desired data records and the second type are informational fields used in computations, retrieval, or other processing. In many instances, a particular field may carry both roles and the field value used in each way, first being used to select a record for processing and then being processed in some manner.

An example of data records having categorical fields and informational fields that will be used throughout this application are records representing Price And Rating Table ("PART") data used in the advertising industry for comparing different options during preparation of advertising campaigns. An example of a PART data record would include key fields such as medium (e.g., Day TV, Hispanic Print, etc.), a market, unit size characteristic of the medium (e.g, 15 second time slot for TV and radio, full-page color for a magazine, etc), and demographics (e.g., women over 35, adults 31–45, etc.) amongst possibly others. Informational fields could include cost per rating point ("CPP"), an average rating associated with a time period, etc.

A PART data record is used throughout this application by way of example and not by limitation to illustrate the present invention and explain the current state of the art in a exemplary context. The present invention explained hereafter and the problems that it resolves apply in many different situations where pseudo-record creation is desirable for one reason or another.

Raw PART data can be used by a media planner to determine optimal options or strategies for media campaigns on particular products. It is beneficial to a media planner to create pseudo data records that are customized so that information can be easily grouped and manipulated. Using raw PART records, a pseudo-record may be created mixing advertising information for a number of markets together in order to manipulate the data more conveniently in a national advertising campaign.

A pseudo-record is based entirely on weighted mixtures of existing records and one simplified example is that of formulas in spreadsheet programs. A formula cell may "mix" the results of one or more other cells according to a weighting and be used in the same manner as any other cell. It is dependant on a "real" cell for meaning but is used equivalently thereby allowing more abstract models of financial data to be built. A pseudo-record builds upon existing records in some fashion to form a more abstract record that can be more easily manipulated to serve the purposes of the user.

Creating pseudo-records can be an arduous, labor intensive task where errors may be easily introduced. For example, each formula cell in a spreadsheet must be created individually. While simple models pose little problems, more complex models may require extensive debugging.

Furthermore, in many instances such as the mixture of all markets using PART records mentioned above may require an entire set of data records due to the other categorical variables that should remain distinct. In other words, the "mixed" market would still be used having the different kinds of media, unit sizes, and demographics. This quickly becomes a combination problem requiring large numbers of potential pseudo-records that only intensifies the natural problems inherent in pseudo-record creation.

What is needed is a method of creating many pseudo-records requiring little user input and selection. Current methods in many instances require painstaking construction of each pseudo-record and automated mechanisms are rare and require improvement. The limiting factor is not the computation of the pseudo-records that can be easily done by those skilled in the art but in the process of user interaction to quickly, easily, and automatically generate a set of relevant pseudo-records for continued manipulation on a more abstract level.

SUMMARY AND OBJECTS OF THE INVENTION

It is an object of the present invention to allow the creation of a plurality of pseudo-objects based on actual data objects requiring a minimum of user input and interaction.

It is another object of the present invention to allow pseudo-records to be used as any other data record including use in creating further pseudo-records.

It is yet another object of the present invention to simplify user effort in creating a plurality of relevant pseudo-records for PART data in a currently preferred embodiment.

Additional objects and advantages of the invention will be set forth in the description which follows, and in part will be obvious from the description, or may be learned by the practice of the invention. The objects and advantages of the invention maybe realized and obtained by means of the instruments and combinations particularly pointed out in the appended claims.

To achieve the foregoing objects, and in accordance with the invention as embodied and broadly described herein a method and computer program product for creating a plurality of mixed pseudo-records composed of weighted mixtures of existing records in a database is provided.

A user selects through an interface, typically a graphical user interface ("GUI"), a particular key field to use as the mix type for creating a plurality of pseudo-records. Variations may occur constraining the user to select from a subset of the key fields depending on implementation.

Next, the user selects particular values of the previously selected key field that will be "mixed" together to form a hybrid value for the pseudo-record. This hybrid value, including weighting as explained hereafter, is saved in formula for so that it may be edited and so that changes made to the underlying records can be easily reflected into the pseudo-records.

Once the values are selected, a weighting is given to each value signifying its fractional composition of the mix. The weighting mechanism (e.g., percentage, relative weight, etc.) is chosen to suit the characteristics of the key field. When mixing database records (actual data records and other pseudo-records) to form pseudo-records, the "mixing" may be additive or fractional. Additive means that data values are simply the cumulative totals of the individual record values multiplied by the weighty factor (typically equal to or greater than 1.0). Fractional means the data values are fractionally composed of the individual record values using a factor of less than 1.0 for each constituent part and all factors totaling 1.0.

In order to make a complete set of pseudo-records, the user selects one or more values for each of the other key fields. This gives the user some control as to the overall size of the generated pseudo-record set and assures that a complete set is generated to provide more options for future manipulation.

After making the aforementioned selections, a general purpose computer will create as many pseudo-records as possible according to the criteria thereby allowing easy creation of a plurality of relevant pseudo-records that can then be manipulated like any other data record. The tedium and inaccuracies normally associated with pseudo-record creation (e.g., formula cells in spreadsheets) is eliminated due to the computer automation of pseudo-record creation.

One approach to pseudo-record creation is achieved by first creating the hybrid value based on the weightings for the selected mix key field. Next, the database of records is searched for records that have the constituent components of the hybrid value for the mix key field and one of the selected values for each of the remaining key fields. Redundancies are present due to the hybrid value triggering multiple records in the search and must be removed (i.e., a three value mix will generate three records all the same except for the mix key field value and would be reduced to one qualifying record). Finally, for each qualifying record a pseudo-record is created using the hybrid value for the mix key field value and the qualifying record field values for the remaining field values. The resulting pseudo-record can be manipulated and used like any other record and can be edited in some embodiments.

Thus, with a limited amount of information and interaction from a user, the present invention allows a set of useful pseudo-records to be created. Such pseudo-records can represent more abstract kinds of information and allow a user to manipulate the underlying information in more useful ways.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIGS. 1A and 1B are tables wherein each row is a data record containing price and rating table (PART) information. FIG. 1A shows this information in its raw format while FIG. 1B shows the rating points in the various time periods including numbers extrapolated from incomplete data records to thereby give all data records a uniform format.

FIGS. 2A and 2B show the process steps taken in one embodiment of the present invention. FIG. 2A is a flow chart illustrating the steps takes by the user in order to input information and create a plurality of pseudo-records while FIG. 2B illustrates the steps taken by the processor in order to actually create the records based on the information received by the user.

FIGS. 3A and 3B show the selection information for a mixture of different mediums and the resulting pseudo-records accord to one embodiment of the present invention. FIG. 3A indicates the actual percentages given to the differing types of media while FIG. 3B shows the created pseudo-records added to the database or table of FIG. 1B.

FIGS. 4A and 4B show the selection information and the resulting pseudo-record creation for pseudo-records created by mixing different markets together using the database of FIG. 4B. FIG. 4A shows the actual weightings given to chosen markets while FIG. 4B shows the resulting the pseudo-records as they appear added to the table of FIG. 3B.

FIGS. 5A and 5B show the selection information for a market mix on an existing medium mix and the resulting pseudo-record creation. More specifically, FIG. 5A shows the weighting for the constituent markets and selection criteria while FIG. 5B shows the resulting pseudo-record as it would appear added to the table of FIG. 4B.

DETAILED DESCRIPTION OF THE PREFERRED EMBODIMENTS

Figure 4B:
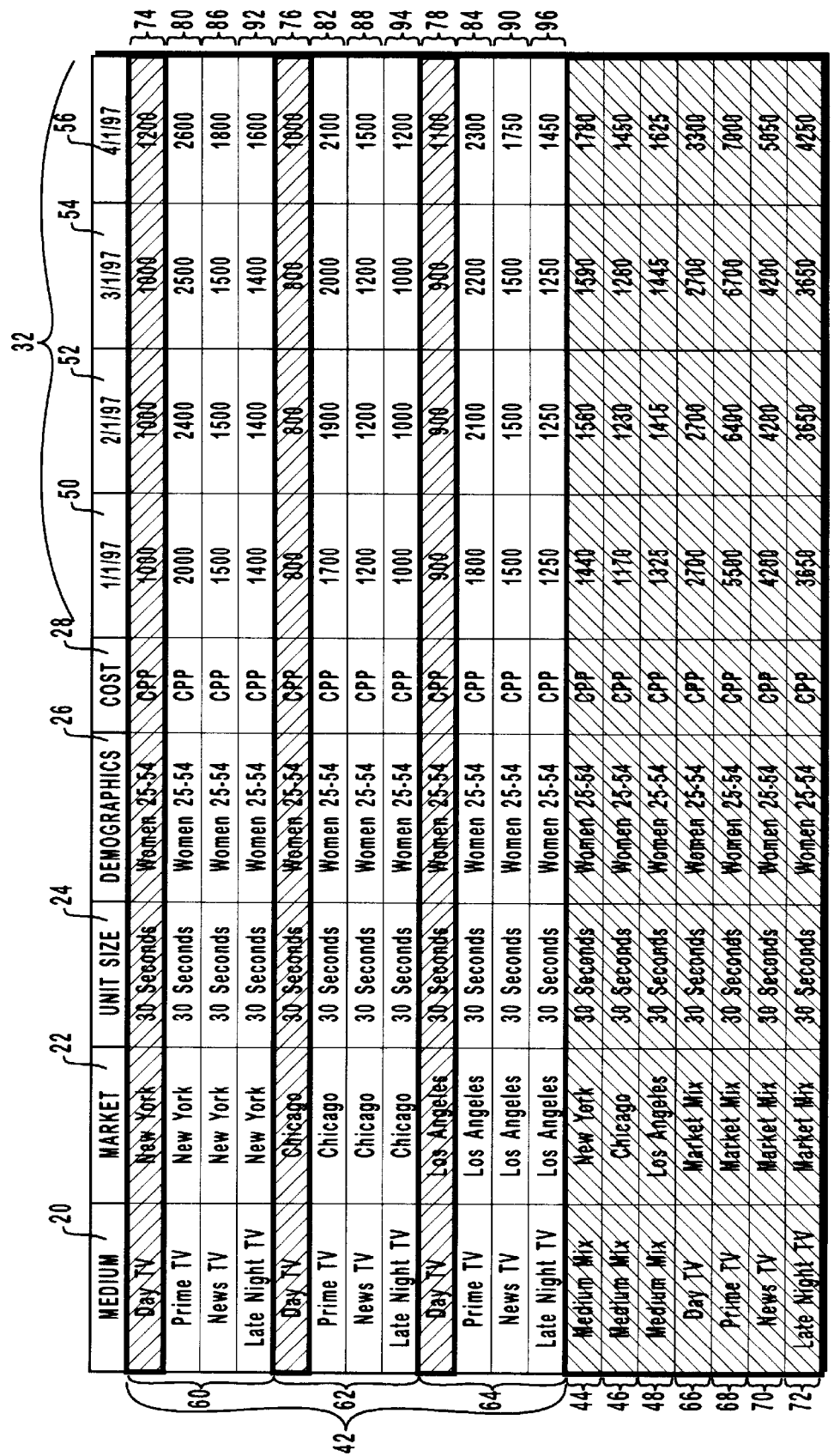

Referring to FIG. 1A, a database of PART information records are shown in tabular format. Each record has a medium key field 20, a market key field 22, a unit size key field 24, and a demographics key field 26. Furthermore, there is a cost data field 28 and time series rating point information field 30. As can be seen, each record is represented by a row and has a value for the aforementioned key and data fields.

Consequently, the rating point information field 30 is composed of one or more time and rating point information coordinates with some coordinates less frequent then others depending on the record.

Each time and rating point coordinate consists of a time period and associated rating points for that time period.

Referring to FIG. 1B, a normalized view of the records of FIG. 1A is shown with missing rating point information 30 extrapolated from the given information to form the time series data fields 32 wherein the data fields correspond to the least common denominator in terms of time period and the values corresponding to these data fields are the rating point values for that time period. For the example data shown in FIGS. 1A and 1B this would be monthly rating point information. A media planner coordinating advertising expenditures would use values for the cost field 28 and the normalized rating point information 32 in order to assess unit sized costs for the particular media. Throughout this application, the normalized view as shown in FIG. 1B will be utilized.

With respect to the data records in FIGS. 1A and 1B, the values for the unit size key field 24 and the demographics key field 26 and the cost data key field 28 are the same for each and every data record in order to simplify the examples that will be explained hereafter. In likelihood, a more realistic data example will have more variations in value and contain many more data records and may further contain even more key fields. The data records shown in FIGS. 1A and 1B, therefore, should be viewed as exemplary for illustrating the principal operation of the present invention and not as any limitation thereof.

Referring now to FIG. 2A, the essential steps taken by the user for creating a plurality of pseudo-records is shown and will be explained generally. Following the general explanation, a number of examples will be shown illustrating the user input and the resulting pseudo-records.

Figure 6:
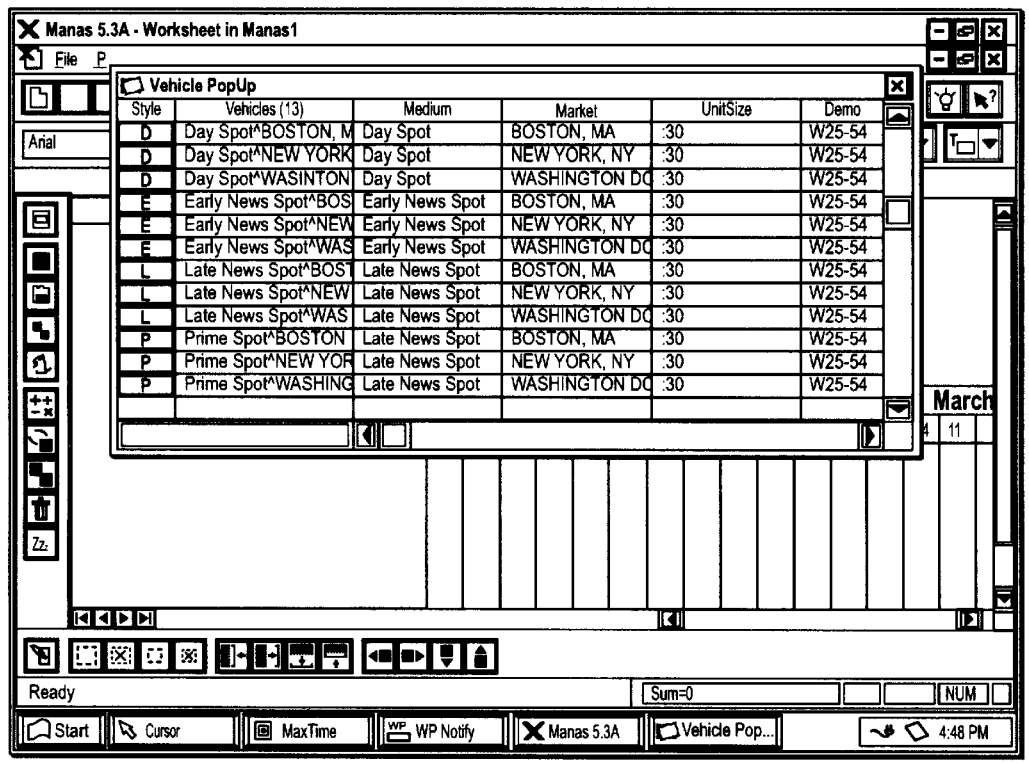
FIGS. 6–12 are screen shots forming Example A that illustrate various aspects of operation of the present invention using a particular user interface.
Figure 7:
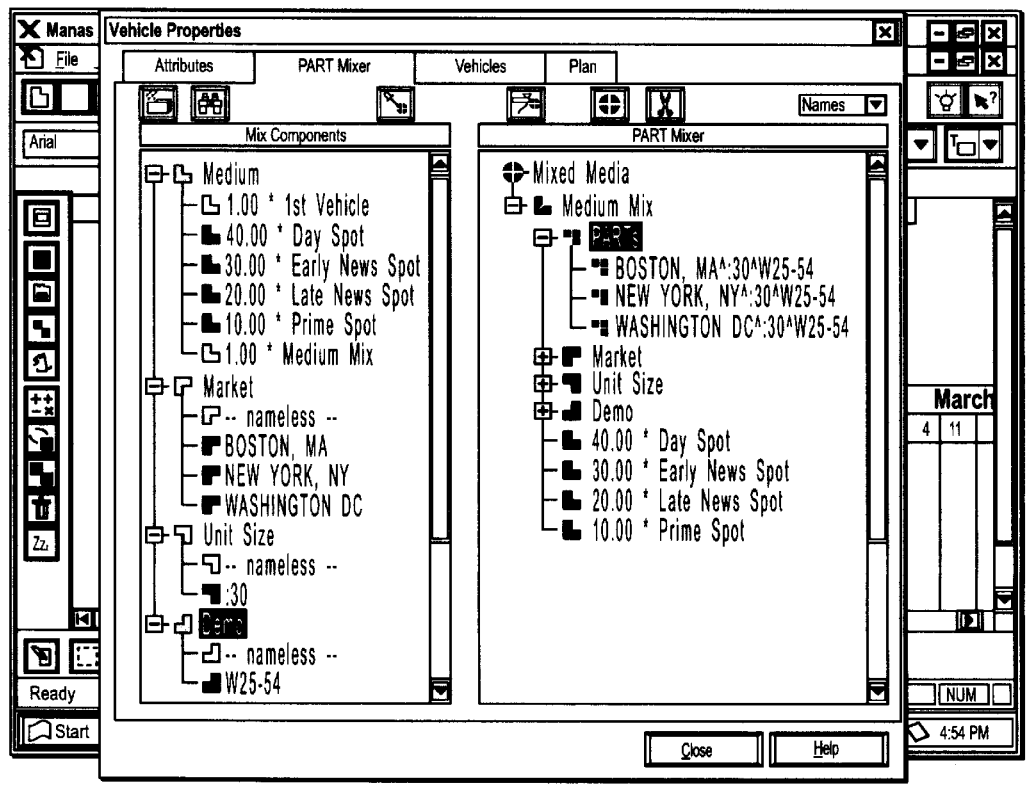
Figure 8:
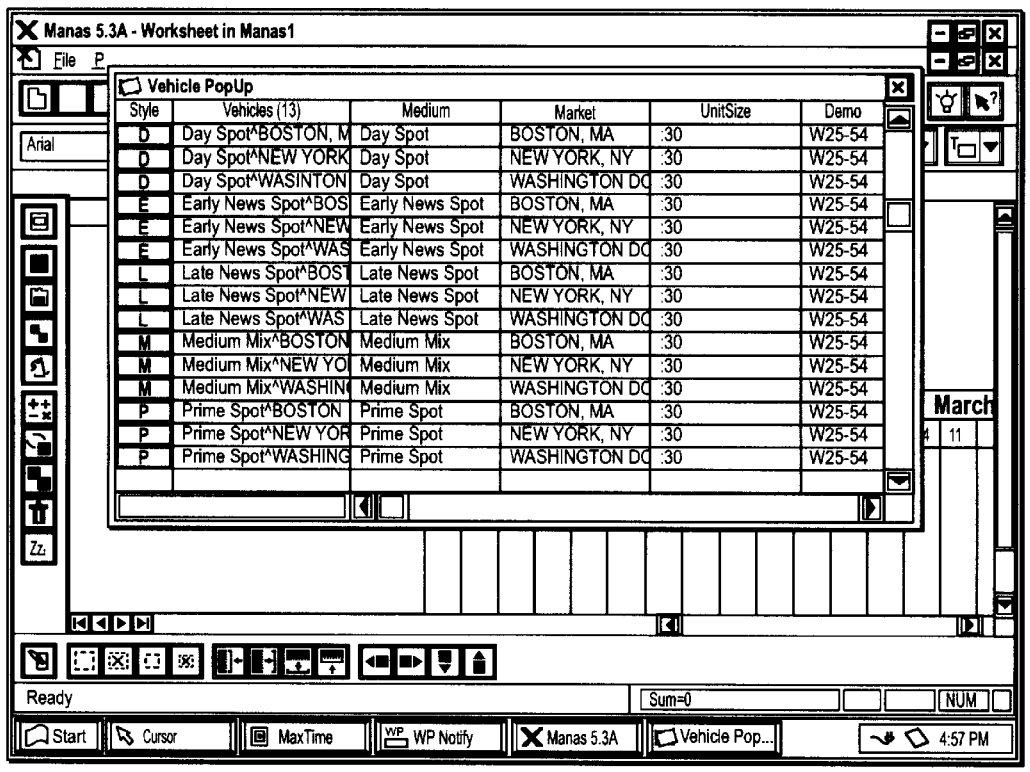
Figure 9:
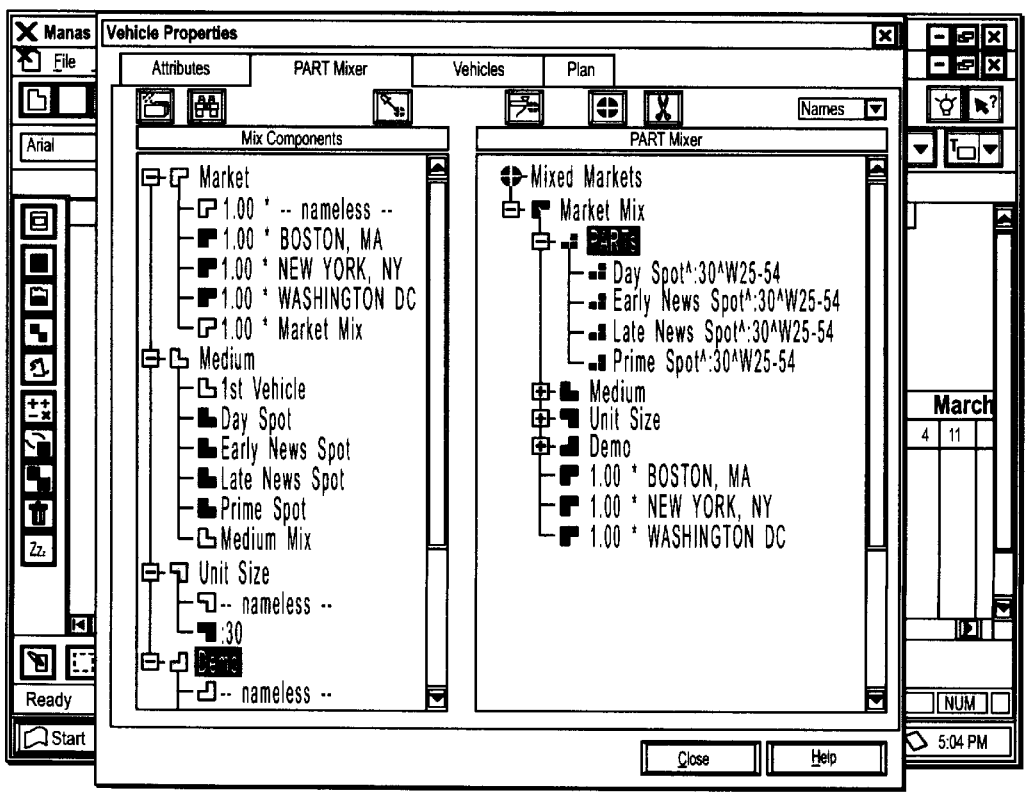
Figure 10:
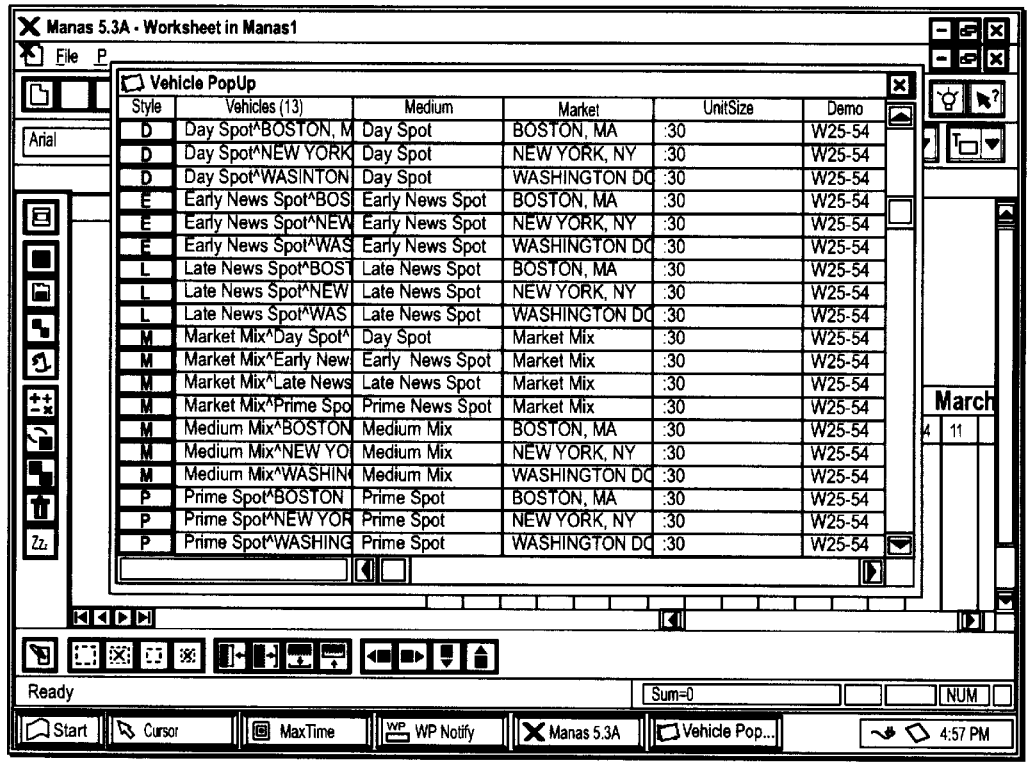
Figure 11:
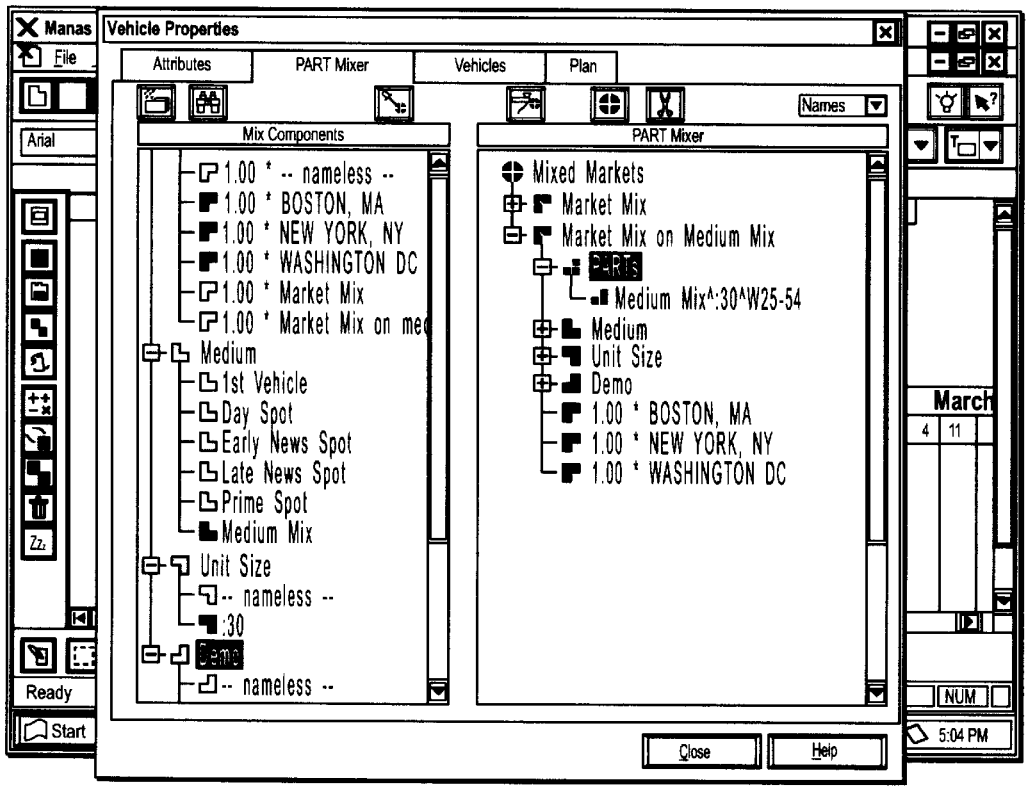

Additionally, an example comprising FIGS. 6–12, contains a number of screen shots showing a user interface and record data similar to that shown hereafter and is provided to show ease of user interaction in creating pseudo-records. Furthermore, a plurality of existing data records is shown in FIG. 6.

Initially, at step 34, a user will select a particular mix category by choosing one of the key fields such as medium key field 20 or unit size key field 24 as the "mix" key field. The mix key field designates a key field in the pseudo-record that will receive for its actual value a formulaic composition of values existing in current records (or pseudo-records) existing in the database. This formulaic composition is referred to as a hybrid value and is calculated by reference to its constituent values in previously existing records and/or pseudo-records.

In order to create the hybrid value, specific mix category values must be chosen and given proper weightings. The user will typically make such selections in a graphical user interface and by assigning weights to the selected values to indicate their proportional weighting in the formulaic composition making up the hybrid value. Such weightings may be chosen in a variety of ways, the simplest being a simple numeric indicator though more complex weighing mechanisms can be chosen. Percentage weighting can be implemented and can be used with automated validation to assure a complete percentage allocation amongst the chosen mixed category values (i.e., all the percentages add up to 100%).

The user must also select at least one value from each of the remaining key fields in order to fully designate a query specification for actual data records for use in creating the pseudo-records as will be explained hereafter. Some implementations may have default values that will search for all possible values for non-selected key fields and those skilled in the art will note that many different implementation-specific variations exist for making these types of selections.

Finally, the pseudo-records are generated at step 40 with the engine generating as many permutations of pseudo-records as possible. The tedium of calculation and the burden of correctly referencing elements of existing data records and creating pseudo-records is achieved accurately and automatically by a computer program running on a computer system comprised of a CPU, display means, and input means.

Referring now to FIG. 2B, one way of actual computation of pseudo-records is shown. Initially, the hybrid value for the selected mix category is created at step 42. This entails storing the formulaic representation of the hybrid value referencing other data records and pseudo-records in a new pseudo-record. It will be stored as the key field value representing the mix category. It may be noted that since this hybrid value is formulaic and based on referencing previous data, that changes in the underlying data may be propagated forward so that the hybrid value is auto-updating when applied to the data fields of the pseudo-record.

Next, the existing records and pseudo-records used for creating the new set of pseudo-records are validated at step 44. This validation includes making a query onto the database to find all of the data records and pseudo-records that meet the criteria previously selected. This would include all the records having values chosen for the remaining key fields other than the mix category as chosen at step 38 of FIG. 2A. This will form the basis for the actual set of pseudo-records based on data records and pseudo-records having the actual values chosen. The query results will be broken down into groups of data records, each group having as many records as there are chosen mix category values. The other key field values will be equivalent and can be used directly in the creation of the pseudo-record. The different groups of data records each represents a pseudo-record base.

Finally, the actual pseudo-records are created at step 46 by mechanisms common to those skilled in the art. For example, an empty record may be created with values for the remaining key fields copied therein from the pseudo-record base and the hybrid formulaic compositions stored in the key field representing the mix category. Furthermore, percentage calculations or other weighting for the data fields are made based on the weightings of the hybrid value and this done on the data field values of the underlying validated records and pseudo-records in the pseudo-record base.

Referring now to FIGS. 3A and 3B an example of a mixture on the medium key field 20 values or medium mix is shown. FIG. 3A shows the percentage weighting for the medium mix components, namely 40% for "Day TV," 30% for "Prime TV," 20% for "News TV," and 10% for "Late Night TV." This selection of mix category and assigning weights to the various category values is representative of step 34 and step 36 of FIG. 2A. Furthermore, all possible values for the remaining key fields in the actual data records 42 (shown in FIG. 3B) are selected in order to create the pseudo-records and this corresponds to step 38 of FIG. 2A. See FIG. 7 for a similar example using a GUI implementation.

FIG. 3B shows the addition of three pseudo-records, namely pseudo-record 44, pseudo-record 46, and pseudo-record 48, respectively, shown as rows in the database of records shown in tabular format in FIG. 3B (pseudo-records shown in cross batching). There are three new pseudo-records based on the number of distinctly validated record groups as would occur in step 44 of FIG. 2B. See FIG. 8 for records being added to a database of a similar example using a GUI implementation.

Pseudo-record 44 will have for its medium key field 20 value the formulaic composition of the medium mix as illustrated in FIG. 3A and be referenced by the name "medium mix." The market key field 22 will be a result of the validated group of data records making up the pseudo-record base or namely "New York" and likewise the unit size key field 24 value will be "30 seconds" and the demographics key field 26 will be "Women 25–54." The cost data field 28 will be the weighted combination of the value found in group of records 60. This value will the same since all of the underlying values are the same and a percentage weighting is used, otherwise it would be additive.

The monthly rating point field 50 value for the pseudo-record 44 will be the weighted values occurring in the group of records 60 according to the weighting shown in FIG. 3A. This may be given by the following equation taking the values of the monthly rating point field 50 for each record in the group of records 60 multiplied by the appropriate percentage waiting to arrive at a final single mixed value as shown below:

$$(0.4)(1{,}000)+(0.3)(2{,}000)+(0.2)(1{,}500)+(0.1)(1{,}400)=1{,}440$$

In like manner, the values for monthly rating point field 52, monthly rating point field 54, and monthly rating point field 56 for the medium mix pseudo-record 44 are calculated using the values for the respective field and the medium mix weightings as shown in FIG. 3A. The weightings will be applied based on the market key field 29 value of the group of records 60 as shown above for the value of the monthly rating point field 50. Again, such tedious calculation is automatically done by a processor as well as the creation of the pseudo-record itself.

Pseudo-record 46 and pseudo-record 48 follow the same processing pattern in order to arrive at the mixed values for the appropriate data fields. Pseudo-record 46 will correspond to the values in the group of records 62 and pseudo-record 48 will correspond to the values in the group of records 64, respectively.

FIGS. 4A and 4B show the selection of criteria for and the creation of another group of pseudo-records based on choosing the market key field 22 as the mix category. FIG. 4A shows three markets chosen with their appropriate weightings relative one to another. It may be noted that a weighting will function differently than a percentage in that weightings are additive while percentages are fractional values when applied to data field values to be mixed. Four pseudo-records, pseudo-record 66, pseudo-record 68, pseudo-record 70, and pseudo-record 72 respectively, are created as a result of the mix selection shown in FIG. 4A and choosing all possible remaining values for the remaining key fields. See FIG. 9 for a similar example using a GUI implementation.

Taking market mix pseudo-record 66 as an example, the medium key field 20 will have a value of "Day TV," the market key field 22 will have hybrid value according to the formulaic weightings of FIG. 4A and having a title of "Market mix," the unit size key field 24 will have a value of "30 seconds" and the demographics key field 26 will have a value of "women 25–54." Since the weightings are additive, the value of the cost data field 28 for the pseudo-record 66 will be the added values of the cost per point data found in the data record 74, data record 76 and data record 78, added together to form the cost per point value for cost data field 28 found in pseudo-record 66.

This additive feature can be shown more readily when looking at actual numeric values for the monthly rating point fields. For example, the value for the monthly rating point field 50 of the pseudo-record 66 is found by combining the monthly rating point field 50 values for data records 74, data record 76, and data record 78, respectively (shown in backwards cross-batching), to distinguish from pseudo-records shown in forward cross-batching, in accordance with the weightings of FIG. 4A as shown in the following equation:

$$(1.0)(1,000)+(1.0)(800)+(1.0)(900)=2,700$$

In like manner, a pseudo-record 66 values for monthly rating point data field 52, monthly rating point data field 54 and monthly rating point data field 56, respectively, are calculated. Furthermore, the pseudo-record 68 will have values calculated from data record 80, data record 82, and data record 84, respectively, again using the market mix weightings as shown in FIG. 4A. Additionally, pseudo-record 70 will derive its data value calculations from data record 86, data record 88 and data record 90, respectively, while pseudo-record 72 will derive its data value calculations from data record 92, data record 94, and data record 96, respectively. See FIG. 10 for a screen shot of a similar example showing the addition of pseudo-record to a database.

Figure 12:
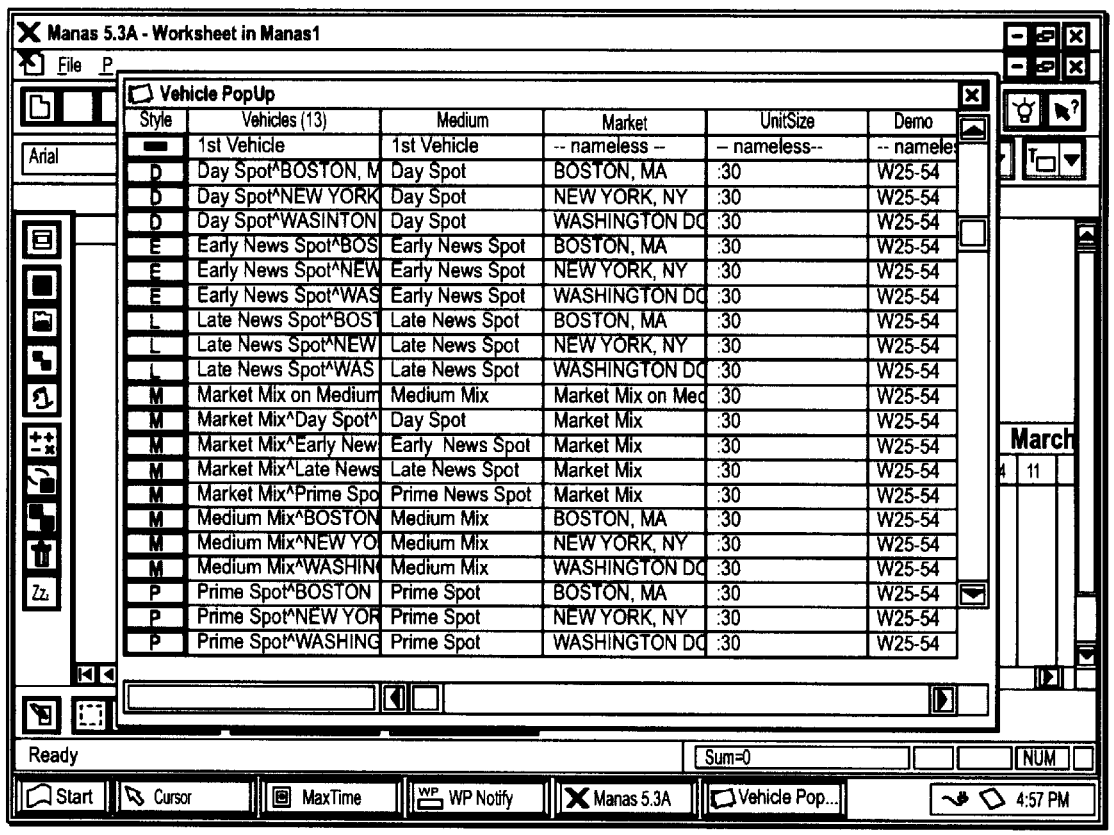

FIGS. 5A and 5B show the creation of a pseudo-record that is itself using a pseudo-record as a selection value. FIG. 5A indicates that market mix category is selected but only one value is chosen for the medium key field, namely the hybrid value of "medium mix" found only in pseudo-records. This represents a mix of a mix wherein two hybrid values are used to arrive at actual data mixing. See FIG. 11 for a screen shot of a similar example doing a mix on a mix. Note that FIG. 12 shows the plurality of records with the newly created "mix on a mix" along with all the other records and pseudo-records (e.g., "mixes").

The new pseudo-record 98 is a pseudo-record based upon a pseudo-record that essentially consolidates the information contained in the 12 actual data records 42 into one mixed data record that can be used for very high level computations by a media planner. Essentially, the pseudo-record 98 is a mix on the group of records 100 (pseudo-record 44, pseudo-record 46, and pseudo-record 48, respectively) with the monthly rating point data field 50 value derived from the following equation:

$$(1.0)(1,440)+(1.0)(1,170)+(1.0)(1,325)=3,995$$

Likewise, the values in pseudo-record 98 for the remaining data fields are computed using the weightings found in FIG. 5A as applied to the respective data fields in the respective pseudo-records. Basically, every data field valve of pseudo-record is a result of every original data record valve as shown in FIG. 1B being manipulated and processed.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system comprising a CPU, a display means controlled by the CPU, and an input means operated by a user connected to the CPU, a method for creating a plurality of mixed pseudo-records composed of weighted mixtures of existing records in a database, each record having data fields with N of those data fields designated as key fields, the creation of pseudo-records requiring minimal user input of information, the method comprising the steps of:

the CPU displaying on the displaying on the display means the key fields and values for said key fields;

designating one of the key fields as the mix field in response to user selection through the interface means;

assigning weights to one or more of the values of the designated mix field according to mix field data type to create a mixed value in response to user selection through the interface means;

designating from each of the N-1 remaining key fields $F_i$, where i=1 to N-1 remaining key fields, one or more values, the total number of values being $X_i$ for each key field $F_i$, the designation in response to user selection through the interface means;

the CPU searching existing records having the $X_i$ values for each of the N-1 remaining key fields $F_1$ in said database to form a plurality of pseudo-record bases; wherein each unique set of values resulting from the search becomes a valid pseudo-record base referencing a group of existing records including data records and pseudo-records; and the CPU forming a pseudo-record from each individual pseudo-record base, the pseudo-record having a hybrid value for the mix field based on the selected mix key values and assigned weightings, values for the remaining N-1 key fields $F_i$ corresponding to the individual pseudo-record base, and each data field having a value calculated from the mix field hybrid value applied to the group of records in the individual pseudo-record base.

2. A method for creating a set of mixed pseudo-records that are composed of weighted mixtures of existing records comprising N key fields and one or more data fields that requires minimal user input of information, the method comprising:

selecting the type of mixture by selecting one of the N key fields as the mix key field in response to user choice;

assigning weights to one or more of the values of the selected key field to create a mixed value for the selected key field in response to user choice;

choosing one or more values for each of the N-1 remaining key fields $F_i$, where i=1 to N-1 remaining key fields, in response to user choice the total number of values being $X_i$ for each key field $F_i$;

creating record groups having the chosen N-1 key field values by searching the database of records; and forming a plurality of pseudo-records corresponding to each of said individual record groups, each pseudo-record having a formulaic hybrid value for the selected mix key field based on said assigned weights to said one or more values of the mix key field, values for the N-1 remaining key fields $F_i$ based on said individual record group, values for each data field based on applying said assigned weights to corresponding data fields in records in said record group having said mix field values to derive a weighted average value.

3. A method for creating a set of mixed pseudo-records that are composed of weighted mixtures of existing records comprising N key fields and one or more data fields that requires minimal user input of information, the method comprising:

selecting the type of mixture by selecting one of the N key fields as the mix key field;

assigning weights to one or more of the values of the selected key field to create a formulaic hybrid value for the selected key field;

choosing one or more values for each of the N-1 remaining key fields $F_i$, where i=1 to N-1 remaining key fields in response to user choices the total number of values being $X_i$ for each key field $F_i$; and creating a plurality of pseudo-records, each data record having data values mixed from existing records and the formulaic hybrid value for the mix key field.

4. A method as recited in claim 3 wherein the number of pseudo-records is based on the combination of the values for the N-1 remaining key fields $F_i$ thereby creating a potential set of $$\sum_{i=1} X_i$$

pseudo-records.

5. A method as recited in claim 3 wherein said chosen $X_i$ values are used to find groups of records in the database, each group of records having the same values for each of said remaining N-1 key fields $F_i$ in each record and used as a basis for creating each pseudo-record.

6. A computer program product as recited in claim 9 wherein said chosen $X_i$ values are used to find groups of records in the database, each group of records having the same values for each of said remaining N-1 key fields $F_i$ in each record and used as a basis for creating each pseudo-record.

7. A computer program product comprising:

a computer usable medium; and computer readable program code means embodied in said medium for use in a computer system comprising a CPU, a display means controlled by the CPU, and an input means operated by a user connected to the CPU, said computer readable program code means for creating a plurality of mixed pseudo-records composed of weighted mixtures of existing records in a database, each record having data fields with N of those data fields designated as key fields, the creation of pseudo-records requiring minimal user input of information, said computer readable program code means comprising;

means for displaying on the displaying on the display means the key fields and values for said key fields;

means for designating one of the key fields as the mix field in response to user selection through the interface means;

means for assigning weights to one or more of the values of the designated mix field according to mix field data type to create a mixed value in response to user selection through the interface means;

means for designating from each of the N-1 remaining key fields $F_i$, where i=1 to N-1 remaining key fields, one or more values, the total number of values being $X_i$ for each key field $F_i$, the designation in response to user selection through the interface means;

means for searching existing records having the $X_i$ values for each of the N-1 remaining key fields $F_i$ in said database to form a plurality of pseudo-record bases; wherein each unique set of values resulting from the search becomes a valid pseudo-record base referencing a group of existing records including data records and pseudo-records; and means for forming a pseudo-record from each individual pseudo-record base, the pseudo-record having a hybrid value for the mix field based on the selected mix key values and assigned weightings, values for the remaining N-1 key fields $F_i$ corresponding to the individual pseudo-record base, and each data field having a value calculated from the mix field hybrid value applied to the group of records in the individual pseudo-record base.

8. A computer program product comprising:

a computer usable medium; and computer readable program code means embodied in said medium for creating a set of mixed pseudo-records that are composed of weighted mixtures of existing records comprising N key fields and one or more data fields that requires minimal user input of information, said computer readable program code means comprising;

means for selecting the type of mixture by selecting one of the N key fields as the mix key field in response to user choice;

means for assigning weights to one or more of the values of the selected key field to create a mixed value for the selected key field in response to user choice;

means for choosing one or more values for each of the N-1 remaining key fields $F_i$, where i=1 to N-1 remaining key fields in response to user choice the total number of values being $X_i$ for each key field $F_i$;

means for creating record groups having the chosen N-1 key field values by searching the database of records; and means for forming a plurality of pseudo-records corresponding to each of said individual record groups, each pseudo-record having a formulaic hybrid value for the selected mix key field based on said assigned weights to said one or more values of the mix key field, values for the N-1 remaining key fields $F_i$ based on said individual record group, values for each data field based on applying said assigned weights to corresponding data fields in records in said record group having said mix field values to derive a weighted average value.

9. A computer program product comprising:

a computer usable medium; and computer readable program code means embodied in said medium for creating a set of mixed pseudo-records that are composed of weighted mixtures of existing records comprising N key fields and one or more data fields that requires minimal user input of information, said computer readable program code means comprising;

means for selecting the type of mixture by selecting one of the N key fields as the mix key field;

means for assigning weights to one or more of the values of the selected key field to create a formulaic hybrid value for the selected key field;

means for choosing one or more values for each of the N-1 remaining key fields $F_i$, where i=1 to N-1 remaining key fields, in response to user choices the total number of values being $X_i$ for each key field $F_i$; and means for creating a plurality of pseudo-records, each data record having data values mixed from existing records and the formulaic hybrid value for the mix key field.

10. A computer program product as recited in claim 9 wherein the number of pseudo-records is based on the combination of the values for the N-1 remaining key fields $F_i$ thereby creating a potential set of $$\sum_{i=1}^{N-1} X_i$$

pseudo-records.

11. A computer program product as recited in claim 9 wherein said chosen $X_i$ values are used to find groups of records in the database, each group of records having the same values for each of said N-1 key fields in each record and used as a basis for creating each pseudo-record.

12. A computer program product as recited in claim 11 wherein each data record of each of said groups of data records will have one of said selected mix category values therein and the weighting accompanying said value will be a multiplier to each data value thereby allowing each data field in said pseudo-record to be a weighted average of each corresponding value of each record in said group of records.

* * * * *

UNITED STATES PATENT AND TRADEMARK OFFICE
CERTIFICATE OF CORRECTION

PATENT NO. : 5,845,284

DATED : Dec. 1, 1998

INVENTOR(S) : Marke James Robinson

It is certified that error appears in the above-identified patent and that said Letters Patent is hereby corrected as shown below:

Col. 2, line 40, after "invention" change "maybe" to --may be--

Col. 2, line 58, after "formula" delete "for"

Col. 3, line 54, after "these" change "drawing" to --drawings--

Col. 4, line 1, after "steps" change "takes" to --taken--

Col. 4, line 8, after "records" change "accord" to --according--

Col. 4, line 16, after "resulting" delete "the"

Col. 4, line 42, after "frequent" change "then" to --than--

Col. 6, line 53, after "will" insert --be--

Col. 7, line 4, after "field" change "29" to --22--

Col. 8, line 12, after "in the" change "12" to --12-- (not bold)

Col. 8, line 48, after "CPU displaying" delete "on the displaying"

Col. 9, line 49, after "user" change "choices" to --choice,--

Col. 10, line 21, after "for displaying" delete "on the displaying"

UNITED STATES PATENT AND TRADEMARK OFFICE
CERTIFICATE OF CORRECTION

PATENT NO. : 5,845,284
DATED : Dec. 1, 1998
INVENTOR(S) : Marke James Robinson

It is certified that error appears in the above-identified patent and that said Letters Patent is hereby corrected as shown below:

Col. 11, line 24, before "minimal" change "requires" to --require--

Signed and Sealed this

Twenty-third Day of November, 1999

Attest:

Q. TODD DICKINSON

*Attesting Officer*   *Acting Commissioner of Patents and Trademarks*